(12) United States Patent
Kim et al.

(10) Patent No.: US 8,627,174 B2
(45) Date of Patent: Jan. 7, 2014

(54) MEMORY DEVICES AND SYSTEMS INCLUDING ERROR-CORRECTION CODING AND METHODS FOR ERROR-CORRECTION CODING

(75) Inventors: Kyung-hyun Kim, Suwon-si (KR); Kwang-il Park, Yongin-si (KR); In-chul Jeong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1482 days.

(21) Appl. No.: 12/132,754

(22) Filed: Jun. 4, 2008

(65) Prior Publication Data

US 2008/0307285 A1    Dec. 11, 2008

(30) Foreign Application Priority Data

Jun. 8, 2007    (KR) .................. 10-2007-0056114

(51) Int. Cl.
*G11C 29/00*    (2006.01)
(52) U.S. Cl.
USPC ............ 714/763; 714/766; 714/772; 714/807
(58) Field of Classification Search
USPC .................................. 714/763, 772
See application file for complete search history.

(56) References Cited

U.S. PATENT DOCUMENTS

| | | | |
|---|---|---|---|
| 6,675,344 B1 | 1/2004 | Sharma | |
| 6,912,680 B1 * | 6/2005 | Keeth | 714/736 |
| 7,428,669 B2 * | 9/2008 | Cioffi | 714/704 |
| 7,458,004 B2 * | 11/2008 | Takahashi | 714/763 |
| 7,562,285 B2 * | 7/2009 | Yang et al. | 714/815 |
| 2004/0237023 A1 * | 11/2004 | Takahashi et al. | 714/768 |
| 2005/0005230 A1 * | 1/2005 | Koga et al. | 714/800 |
| 2005/0024974 A1 * | 2/2005 | Noguchi et al. | 365/230.03 |
| 2007/0079057 A1 * | 4/2007 | Ruckerbauer et al. | 711/105 |
| 2007/0230231 A1 * | 10/2007 | Ogawa et al. | 365/64 |
| 2008/0126843 A1 * | 5/2008 | Nygren et al. | 714/6 |
| 2010/0293438 A1 * | 11/2010 | Lastras-Montano et al. | 714/763 |
| 2011/0209036 A1 * | 8/2011 | Yang et al. | 714/807 |

* cited by examiner

Primary Examiner — Albert Decady
Assistant Examiner — Justin R Knapp
(74) Attorney, Agent, or Firm — Volentine & Whitt, PLLC

(57) ABSTRACT

In one aspect, a memory device includes a memory cell array, parallel internal data paths which transmit internal data to and from the memory cell array, a data driver which transmits and receives external data, and a data buffer which delays and transfers the external data received by the data driver to the internal data paths, and which delays and transfers the internal data transmitted from the memory cell array to the data driver. The memory device further includes an error correction code generator which generates an error correction code (EC) based on the internal data transmitted on the internal data paths, an EC buffer which delays the error correction code generated by the error correction code generator, an EC driver which transmits the error correction codes delayed by the EC buffer, and a latency controller which variably controls a delay time of at least one of the data buffer and the EC buffer.

8 Claims, 9 Drawing Sheets

MEMORY DEVICES AND SYSTEMS INCLUDING ERROR-CORRECTION CODING AND METHODS FOR ERROR-CORRECTION CODING

PRIORITY STATEMENT

A claim of priority is made to Korean patent application no. 10-2007-0056114, filed Jun. 8, 2007, the contents of which are incorporated herein in their entirety.

SUMMARY

A memory device of one aspect of the invention includes a plurality of parallel data transmission paths which transmit data, and an error correction (EC) control transmission path which transmits error correction codes. A data driver drives the data transmitted on the data transmission paths, and an EC driver drives the error correction codes transmitted on the EC transmission path. A latency controller is provided which variably controls a difference in latency between the transmitted data and the transmitted error correction codes.

A memory device of another aspect of the invention includes a memory cell array, parallel internal data paths which transmit internal data to and from the memory cell array, a data driver which transmits and receives external data, and a data buffer which delays and transfers the external data received by the data driver to the internal data paths, and which delays and transfers the internal data transmitted from the memory cell array to the data driver. The memory device further includes an error correction code generator which generates an error correction code (EC) based on the internal data transmitted on the internal data paths, an EC buffer which delays the error correction code generated by the error correction code generator, an EC driver which transmits the error correction codes delayed by the EC buffer, and a latency controller which variably controls a delay time of at least one of the data buffer and the EC buffer.

A memory device of another aspect of the invention includes a parallel-type error correction (EC) control configuration and further includes a programmable difference in latency between a data latency and an EC latency.

A system of another aspect of the invention includes a memory which includes a memory cell array, a memory controller which controls the reading and writing of data from and to the memory cell array, a plurality of parallel data lines connected between the memory and the memory controller, and a error correction (EC) control line connected between the memory and the memory controller. At least one of the memory and the memory controller includes error correction (EC) control circuitry configured to vary a difference between a data latency and an EC latency of the system.

A parallel-type error correction (EC) control method for a memory device of another aspect of the invention includes varying a difference between a data latency and an ECC latency in accordance with a data transmission frequency.

A parallel-type error correction (EC) control method for a memory device of another aspect of the invention includes varying a difference between a data latency and an ECC latency in accordance with whether a read operation or a write operation is being executed by the memory device.

BRIEF DESCRIPTION OF THE DRAWINGS

The above and other aspects and features of embodiments of the present invention will become readily apparent from the detailed description that follows, with reference to the accompanying drawings, in which.

DETAILED DESCRIPTION OF EMBODIMENTS

Figure 1:
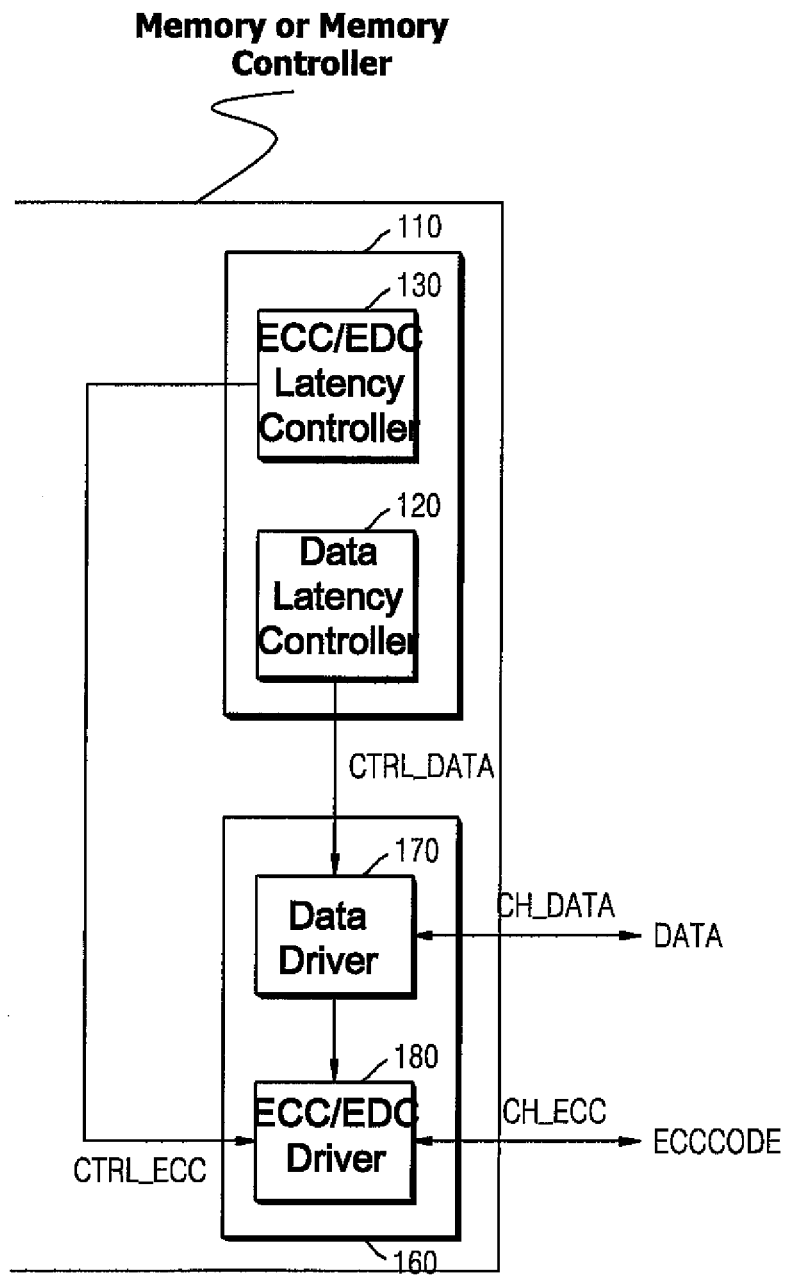
FIG. 1 is a block diagram of a memory device according to an embodiment of the present invention.

The present invention will now be described by way of preferred, but non-limiting, embodiments of the invention.

For ease of understanding and to avoid redundancy, like reference numbers refer to the same or similar elements throughout the drawings. Also, while the drawings contain a number of circuit elements, it will be understood from the nature of electrical circuits that when an element is described as being connected to another element, it can be directly connected the other element or one or more intervening elements may be present. In contrast, if an element is referred to as being "directly connected to" another element, then no intervening elements are present. Other words used to describe the relationship between elements should be interpreted in a like fashion (e.g., "between" versus "directly between," "adjacent" versus "directly adjacent," "connected" versus "directly connected," etc.).

As is traditional in the field of the present invention, embodiments of the invention are described in terms of functional blocks or units. It will be readily understood that the functional blocks or units denote electronic circuits which are configured (e.g., by dedicated and/or programmable circuitry) to execute the signaling and/or computational operations described herein. Also, it will be readily understood that one or more functional blocks may be physically combined into complex circuitry without departing from the spirit and scope of the present invention.

In the embodiments that follow, examples are presented in which a high speed memory system is equipped with parallel type error correction control in which error correction data is transmitted on a separate channel in parallel with data of the memory system. Both the error correction data and the memory system data may be transmitted in the form of data packets.

The memory system itself is not limited, and examples include dynamic random access memories (DRAM), such as the main DRAM and/or graphic DRAM of a computer system, and memory controllers, such DRAM and graphics controllers. Other examples include flash memories (e.g., NOR flash and NAND flash), phase-change random access memories (PRAM), ferroelectric random access memories (FRAM), multi-media random access memories (MMRAM), resistance random access memories (RRAM), and others. Further, the memory system may be contained, for example, in one of a computer system, a graphics card, a gaming system, or an interactive video system.

Herein, error correction control broadly refers to any type of error correction coding scheme in which error bits are transmitted on one or more separate channels to check for errors in memory data (i.e., "real" data) transmitted on parallel channels. In a packet based transmission system, examples include ECC/EDC and/or CRC coding schemes, where ECC denotes "error correction code", EDC denotes "error detection code", and CRC denotes "cyclic redundancy code". In the embodiments that follow, packet type ECC/EDC schemes are described by way of example, and the correction data is referred to as ECC data and/or ECC/EDC. The invention is not limited in this respect, and the term error correction (EC) control is utilized when referencing error correction and decoding in a generic sense.

FIG. 1 is a block diagram illustrating a memory system according to an embodiment of the present invention, which includes a latency control circuit 110 and a drive circuit 160. In the example of FIG. 1, the memory system is either a semiconductor memory (e.g., a DRAM), or a memory controller which communicates with an external semiconductor memory.

Referring first to the drive circuit 160, included therein is a data driver 170 and an ECC/EDC driver 180. The data driver 170 generates real data DATA of the memory system on parallel data channels CH_DATA, and the ECC/EDC driver 180 generates error correction codes ECCCODE on one or more error correction code channels (CH_ECC). In particular, the ECC/EDC driver 180 utilizes a part of the data generated by the data driver 170 to calculate and generate the error correction codes ECCCODE. In the examples that follow herein, the error correction codes ECCCODE are transmitted on a single channel. However, the invention is not limited in this respect.

The embodiment of FIG. 1 is characterized by latency control of the data driver 170 and the ECC/EDC driver 180. This is represented in FIG. 1 by the provision of an ECC/EDC latency controller 130 which generates a latency control signal CTRL_ECC that is applied to the ECC/EDC driver 180, and by the provision of a data latency controller 120 which generates a latency control signal CTRL_DATA that is applied to the data driver 170. More detailed examples of latency control functionality will be described later herein. Briefly, however, the latency of the data driver 170 is controlled by the latency control signal CTRL_DATA, and the latency of the ECC/EDC driver is controlled by the latency control signal CTRL_ECC.

Parallel type error correction control schemes are characterized by both data latency and error correction latency. Data latency refers to the number of clock cycles that elapse between the time at which a read command (RD) or write command (WR) is generated, and the time at which the data driver 170 actually begins transmitting real data. Error correction latency refers to the additional number of clock cycles required for error correction code calculations and generation to take after receipt of data generated by the data driver 170.

Figure 2:
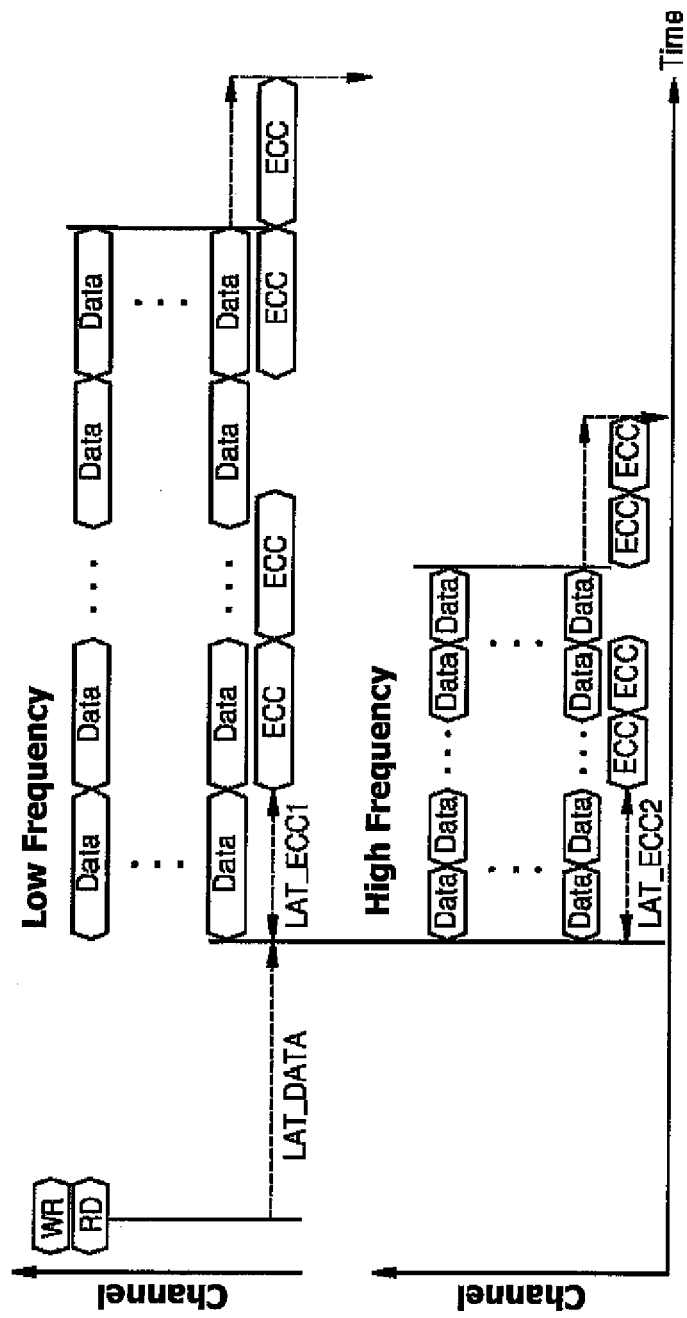
FIG. 2 is a timing diagram illustrating a latency control according to an embodiment of the present invention.

The operation of the memory system of FIG. 1 according to an embodiment of the present invention will now be described with reference to the timing diagram of FIG. 2. In FIG. 2, a single packet of data is transmitted on plural channels, and corresponding error corrections codes ECC are transmitted on a single channel.

Referring now collectively to FIGS. 1 and 2, when the memory device is operating at a relatively low transmission frequency, each unit interval (UI) of the data transmitted on the parallel data channels CH_DATA is relatively long (time-wise). In contrast, when operating at a relatively high transmission frequency, each unit interval (UI) of the data transmitted on the parallel data channels CH_DATA is relatively short. Thus, the number of unit intervals (UI's) required for the error correction code calculations and generation may be different during a low transmission frequency operation than at a high transmission frequency operations.

In the example of FIG. 2, during a low transmission frequency, the ECC/EDC latency controller 130 controls the ECC/EDC driver 180 to set the error correction code latency LAT_ECC1 at one (1) unit interval (UI). On the other hand, during a high transmission frequency, the ECC/EDC latency controller 130 controls the ECC/EDC driver 180 to set the error correction code latency LAT_ECC2 at two unit intervals (UI's). In this manner, the user can adapt the ECC/EDC latency to transmission frequency. In other words, for example, if the maximum transmission frequency of the memory system requires an ECC/EDC latency of two (2) unit intervals (UI's), it may not necessary to also provide two (2) unit intervals (UI's) of ECC/EDC latency during a lower transmission frequency. That is, overall latency during the low transmission frequency domain by selectively controlling the latency of the ECC/EDC driver 180.

Returning to FIG. 1, both an ECC/EDC latency controller 130 and a data latency controller 120 are illustrated. It is pointed out, however, that the invention also encompasses systems in which only one of data latency or error correction latency is controlled. An example of this has already been shown, i.e., in the timing diagram of FIG. 2, only ECC/EDC latency is controlled according to the frequency of transmission.

Figure 3:
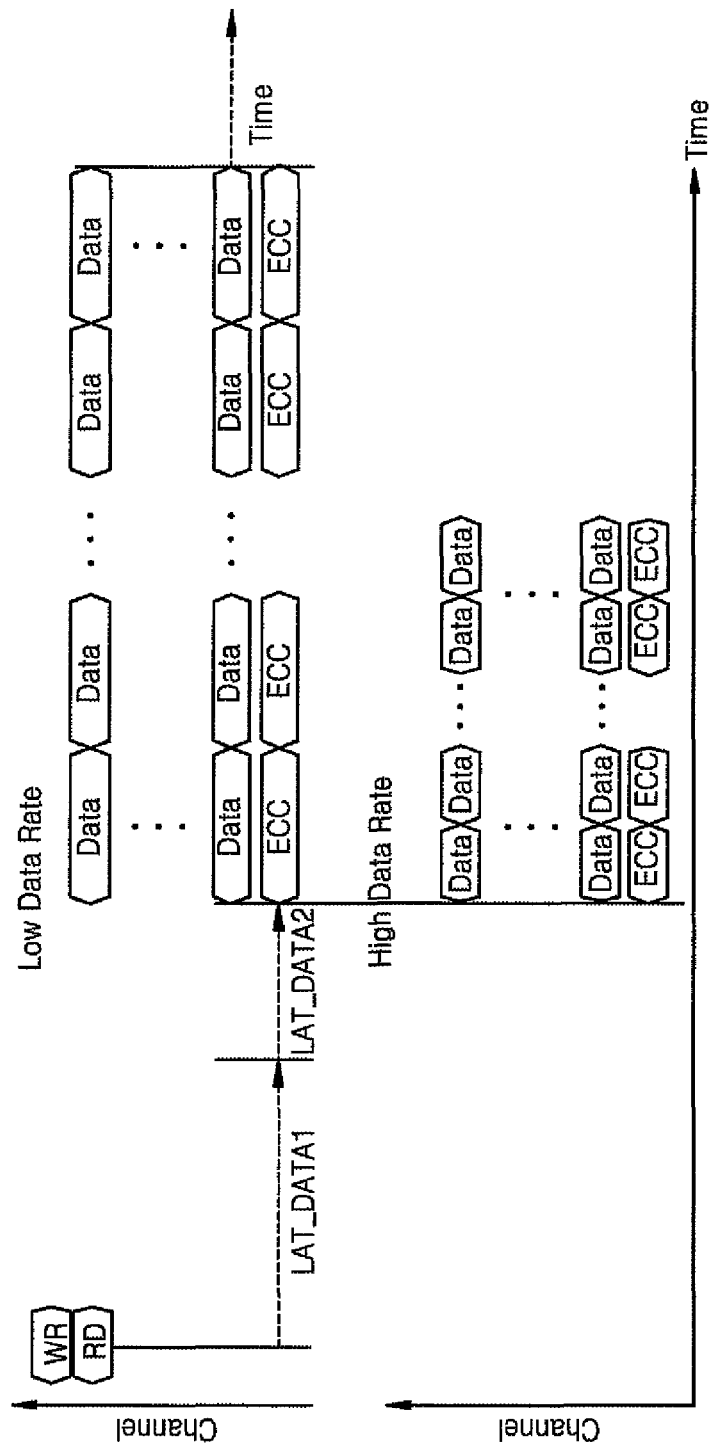
FIG. 3 is a timing diagram illustrating a latency control according to another embodiment of the present invention.

FIG. 3 is a timing diagram illustrating an example in which only data latency is controlled. In this example, the data latency controller 120 increases the data latency of the data driver 170 by an amount equal to the ECC/EDC latency. That is, in FIG. 3, the inherent or real data latency is denoted as LAT_DATA1, and the ECC/EDC latency is equal to a latency denoted as LAT_DATA2. In this embodiment, the data latency controller 120 controls the data driver 170 to add the additional latency LAT_DATA2, for both the low transmission frequency and high transmission frequency domains. Thus, the data and corresponding error correction codes (ECC) are simultaneous transmitted, which may allow for reduced circuit complexity at the receiving end of the data.

Figure 4:
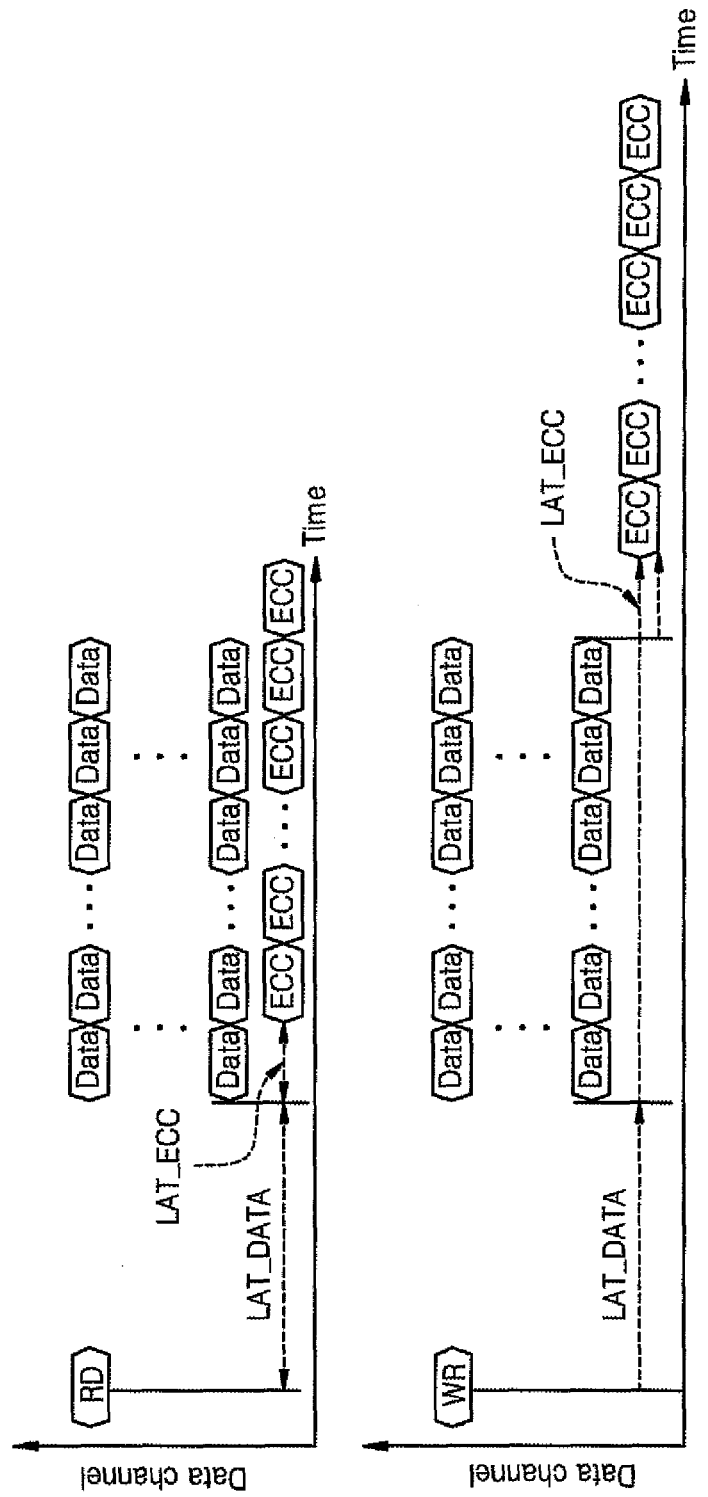
FIG. 4 is a timing diagram illustrating a latency control according to another embodiment of the present invention.

In the timing diagrams of FIGS. 2 and 3 above, the data latency and error correction latency is the same for both read (RD) and write (WR) operations. FIG. 4 illustrates another embodiment in which different latency control is executed for read and write operations. In particular, in the example of FIG. 4 no latency control is executed during a read (RD) operation. Thus, the actual data latency is the same as the inherent data latency LAT_DATA, and the actual error correction code ECC latency is the same as the inherent ECC latency LAT_ECC. (The overall latency of the error correction codes from the generation of the read command RD is LAT_DATA+LAT_ECC.) On the other hand, during a write operation, FIG. 4 illustrates additional latency being added to the actual error correction code ECC latency. In this example, the amount of latency added is equal to the number of clock cycles of one packet of data. Thus, the overall error correction code latency from issuance of the write command WR is the inherent data latency, plus the number of clock cycles of one packet, plus the inherent ECC latency. Again, by manipulating the arrival time of the error correction codes (ECC) relative to the corresponding data, it may be possible to increase circuit efficiency at the receiving end of the data.

Figure 5:
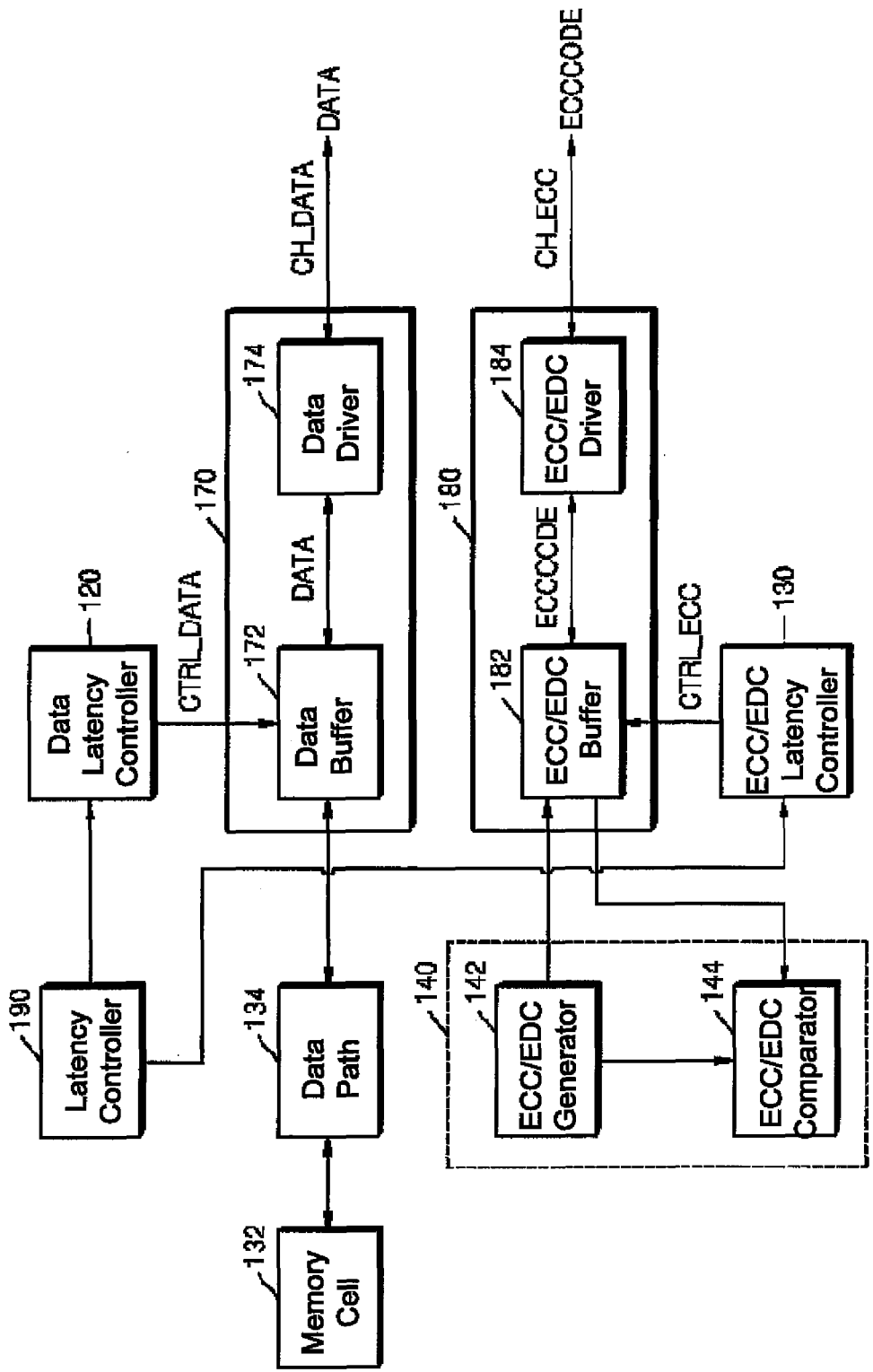
FIG. 5 is a block diagram of a memory device according to another embodiment of the present invention.

FIG. 5 is a block diagram of a memory system according to another embodiment of the present invention.

Referring to FIG. 5, the memory system includes a memory cell array 132, an internal bi-directional data path 134, a data input/output circuit 170, an ECC/EDC circuit 140, an ECC/EDC input/output circuit 180, a latency controller 190, a data latency controller 120, and an ECC/EDC latency controller 130.

The memory cell array 132 stores internal data which may be written from and read to the internal data path 134 (which includes a plurality of parallel data paths), and the data input/output circuit 170 transmits data back and forth between the internal data path 134 and external data channels CH_DATA. In the figure, external data is shown as DATA.

In the example of FIG. 5, the data input/output circuit 170 includes a data buffer 172 and a data driver 174. The data buffer 172 may be a FIFO type circuit which temporarily stores (delays) and transfers the external data DATA received by the data driver 174 to the internal data path 134, and temporarily stores (delays) and transfers the internal data transmitted from the internal data path 134 to the data driver 174. The data driver 174 transmits and receives the external DATA on the data channels CH_DATA, and interfaces with the data buffer 172.

The ECC/EDC input/output circuit 180 includes an ECC/EDC buffer 182 and an ECC/EDC driver 184. The ECC/EDC buffer 182 may be a FIFO type circuit which temporarily stores (delays) and transfers external ECC/EDC codes ECCCODE received by the ECC/EDC driver 184 to the ECC/EDC circuit 140, and temporarily stores (delays) and transfers the internal ECC/EDC codes transmitted from the ECC/EDC circuit 140 to the ECC/EDC driver 184. The ECC/EDC driver 184 transmits and receives the external ECC/EDC codes ECCCODE on the ECC/EDC channel CH_ECC, and interfaces with the ECC/EDC buffer 182.

The ECC/EDC circuit 140 includes an ECC/EDC generator 142 and an ECC/EDC comparator 144. The ECC/EDC generator generates error corrections codes which are applied to the ECC/EDC buffer 182 when data and error correction codes are transmitted from the memory system, and error correction codes which are applied to the ECC/EDC comparator 144 when data and error correction codes are received by the memory system. The ECC/EDC comparator 144 compares received error correction codes from the ECC/EDC buffer 182 with error correction codes generated by the ECC/EDC generator 142.

The data latency controller 120 is responsive to the latency controller 190 to generate a data latency control signal CTRL_DATA which controls a storage time (or FIFO delay time) of the data buffer 172. The ECC/EDC latency controller 130 is responsive to the latency controller 190 to control a storage time (or FIFO delay time) of the ECC/EDC buffer 182.

The latency controller 130 itself may, for example, take the form of user generated external signals derived from one or more pin terminals of the memory device. Alternately, for example, the latency controller 130 may be a mode register set (MRS) which contains preset data for controlling latencies of the memory device.

In a write operation, real data DATA is received from the data channels CH_DATA and passes FIFO through the data buffer 172, and is transferred to the ECC/EDC generator 142. In the meantime, error correction codes ECCCODE received on the error correction channel CH_ECC are passed FIFO through the ECC/EDC buffer 182, and transferred to the ECC/EDC comparator 144. The ECC/EDC comparator 144 compares the error check bits of the received error correction code ECCCODE with error check bits generated by the ECC/EDC generator 142, and generates an error flag upon detecting a mismatch.

In the present embodiment, the delay between receipt of the data DATA and the corresponding error correction codes is programmable as described above, for example, in connection FIGS. 2-4. In other words, the difference in data latency and ECC latency is programmable, and is reflected in the data latency control signal CTRL_DATA and the error correction code latency control signal CTRL_ECC.

In a read operation, data selected from the memory cell array 132 is applied to the internal data path 134 and passes FIFO through the data buffer 172, and is then transferred to the data channels CH_DATA through the data driver 174. In the meantime, all or part of the data is applied to the ECC/EDC generator 142, which then calculates and generates error correction codes. The error correction codes ECCCODE are passed FIFO through the ECC/EDC buffer 182, and are then transferred to the error correction code channel CH_ECC.

In the present embodiment, the delay between transmission of the data DATA and the corresponding error correction codes ECCCODE is programmable as described above, for example, in connection FIGS. 2-4. That is, the difference in data latency and ECC latency is programmable, and is reflected in the data latency control signal CTRL_DATA and the error correction code latency control signal CTRL_ECC.

Figure 6:
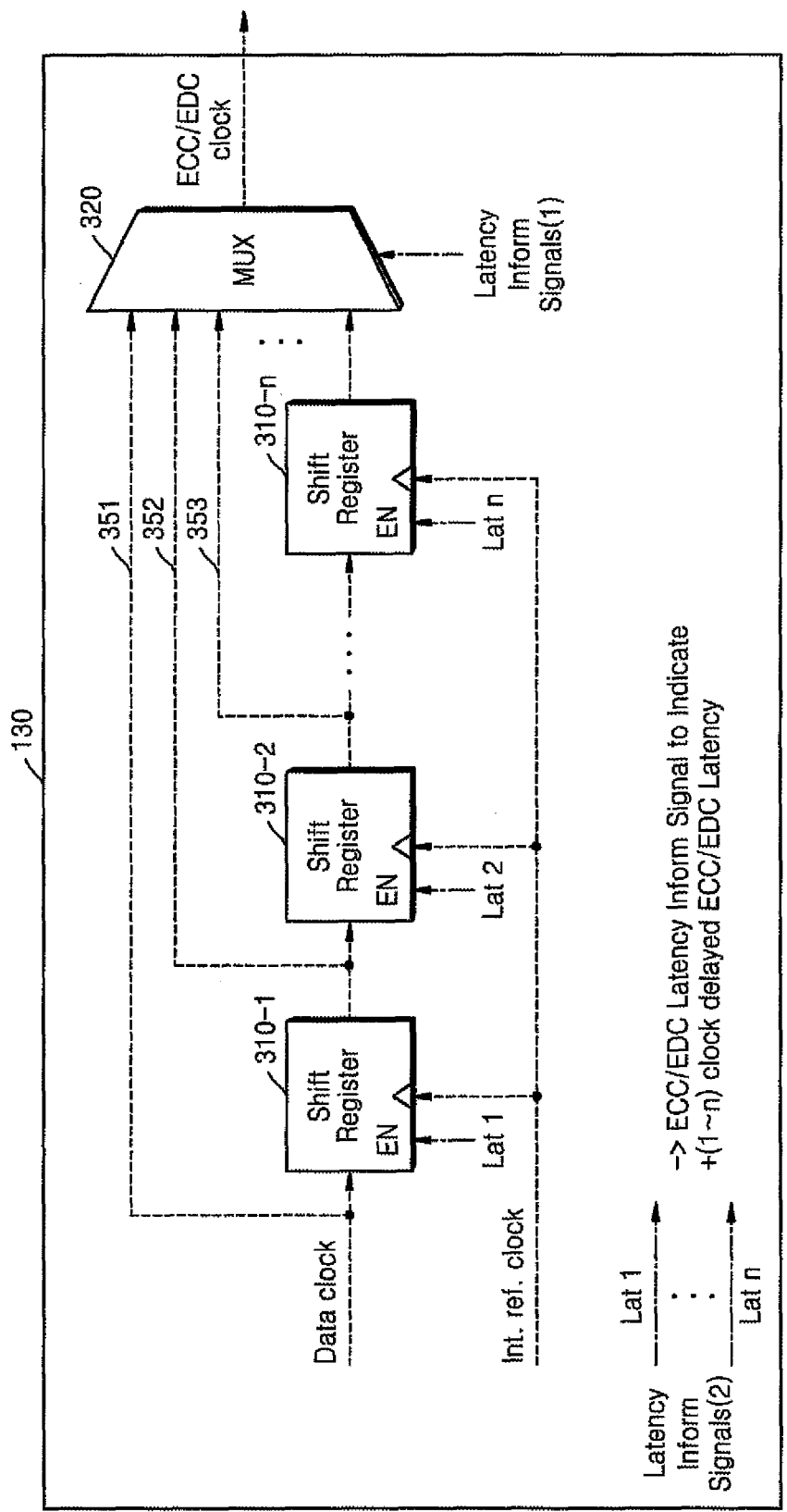
FIG. 6 is a circuit diagram illustrating an example of an ECC/EDC latency controller according to an embodiment of the present invention.
Figure 7:
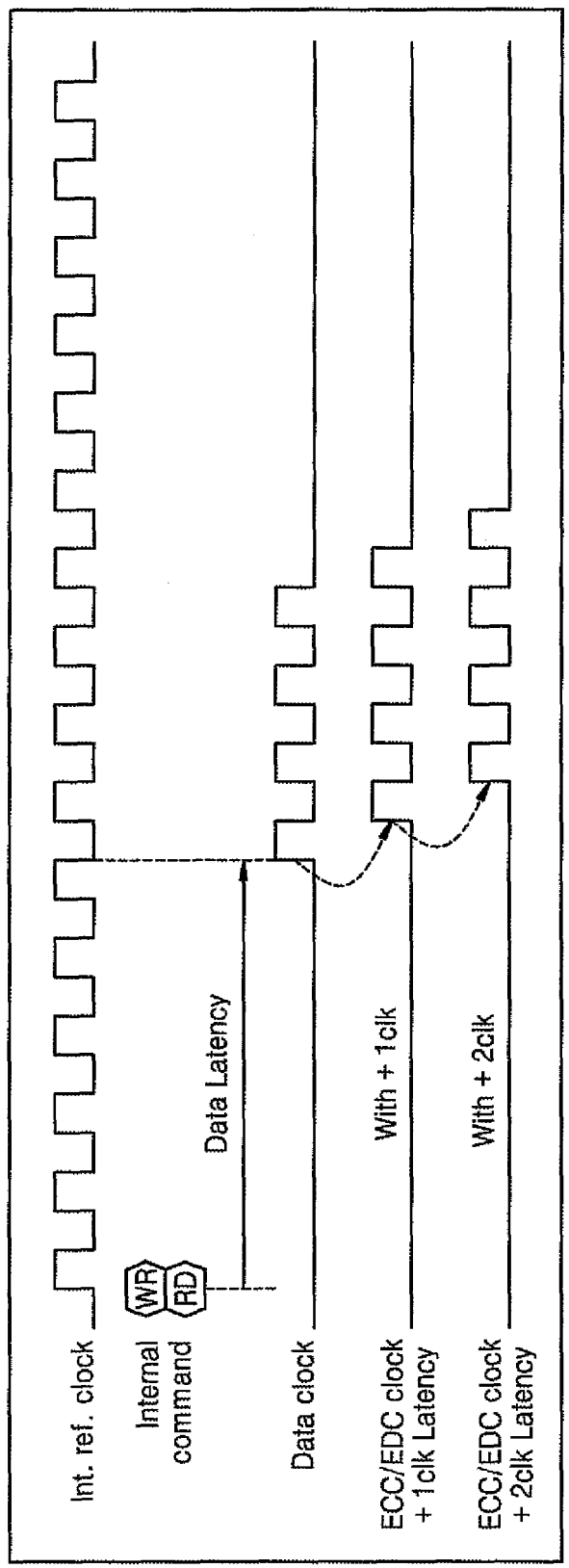
FIG. 7 is a timing diagram for use in explaining an operation of the ECC/EDC latency controller of FIG. 6.

FIG. 6 illustrates an example of the ECC/EDC latency controller 130 of FIG. 5, and FIG. 7 is a timing diagram for use in describing the operation of thereof. The data latency controller 120 may, for example, be similarly configured.

In the example of FIG. 6, the ECC/EDC latency controller 130 includes "n" cascade connected shift registers 310-1 through 310-$n$, and a multiplexer circuit MUX 320. The clock terminal of each shift register <310-1:310-$n$> receives an internal clock signal, whereas a data clock signal is applied to the input of the first shift register 310-1 and as an input to the multiplexer MUX 320.

Referring collectively to FIGS. 6 and 7, the data clock signal is synchronized with the internal reference clock, and is delayed by a time corresponding to the inherent data latency. Generally, the internal clock signal is an internally generated PLL or DLL clock that is utilized to control various functional blocks of the memory device. It is also possible, however, to utilize an externally supplied clock in place of the internal reference clock.

The data clock is applied to the MUX 320 without delay via line 351 of FIG. 6. Further, assuming the shift registers <310-1:310-$n$> are all enabled, an ECC/EDC clock with +1 latency is applied to the MUX 320 via line 352, an ECC/EDC clock with +2 latency is applied to the MUX 320 via line 353, and so on.

In FIG. 6, latency information signals (1) are utilized to control the 320 to select one of the input clocks applied to the MUX 320. The output of the MUX 320 is applied as an ECC/EDC clock which controls delay time of the ECC/EDC buffer 182 (FIG. 5). For example, when the user (or MRS) selects a +1 ECC/EDC clock, the MUX 320 generates the clock of line 352 as the ECC/EDC clock output therefrom.

The latency information signals (2) (Lat 1 through Lat n) may be utilized to selectively disable the operation of any unneeded shift registers 310-1 through 310-$n$. For example, if the MUX 320 generates the clock of line 352 as the ECC/EDC clock output therefrom, the shift registers 310-2 through 310-$n$ become operationally unnecessary. It will be understood that the latency information signals (1) and (2) are closely related and can be combined into a common set of latency information signals.

Figure 8:
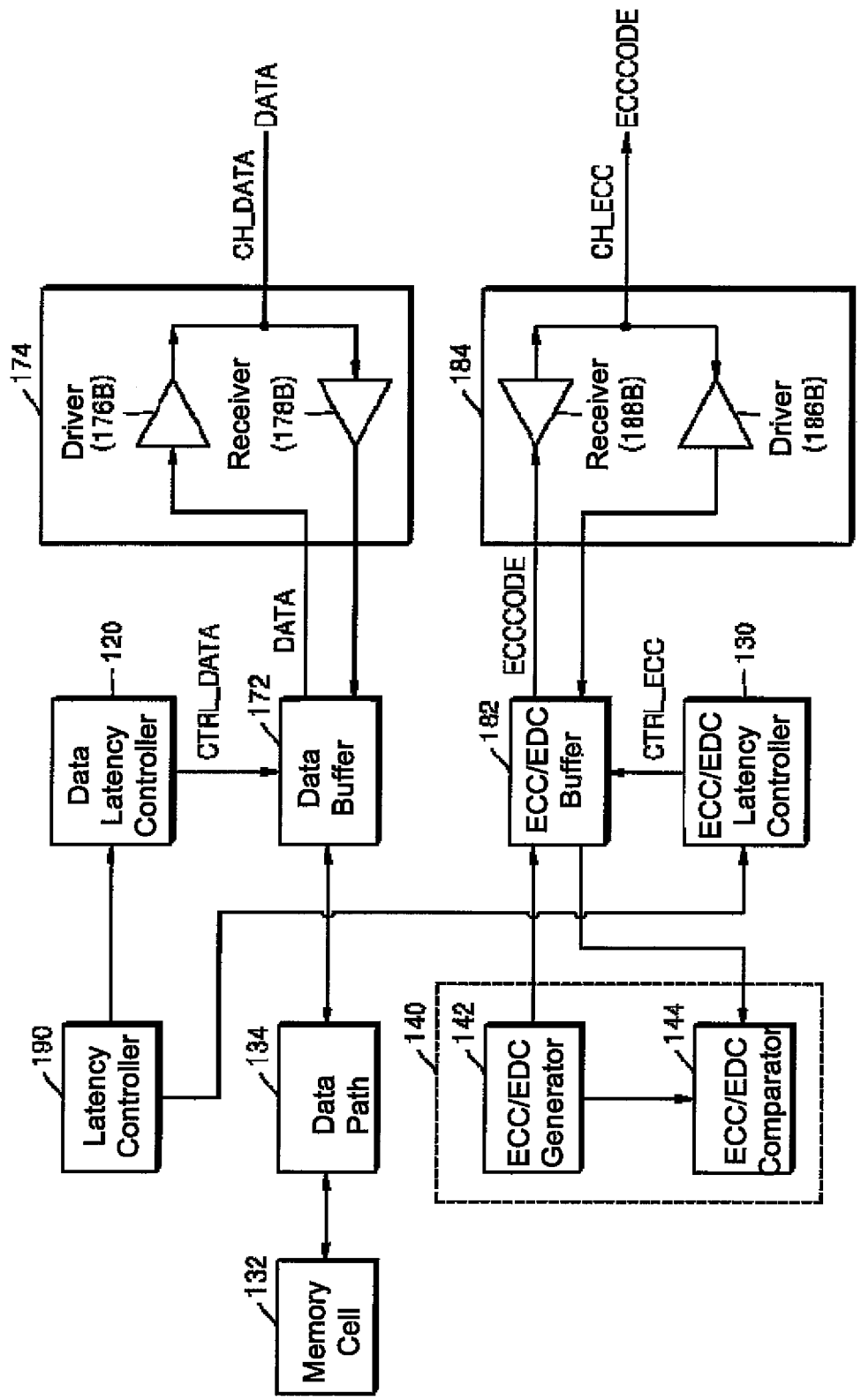
FIG. 8 is a block diagram of a memory device according to another embodiment of the present invention.
Figure 9:
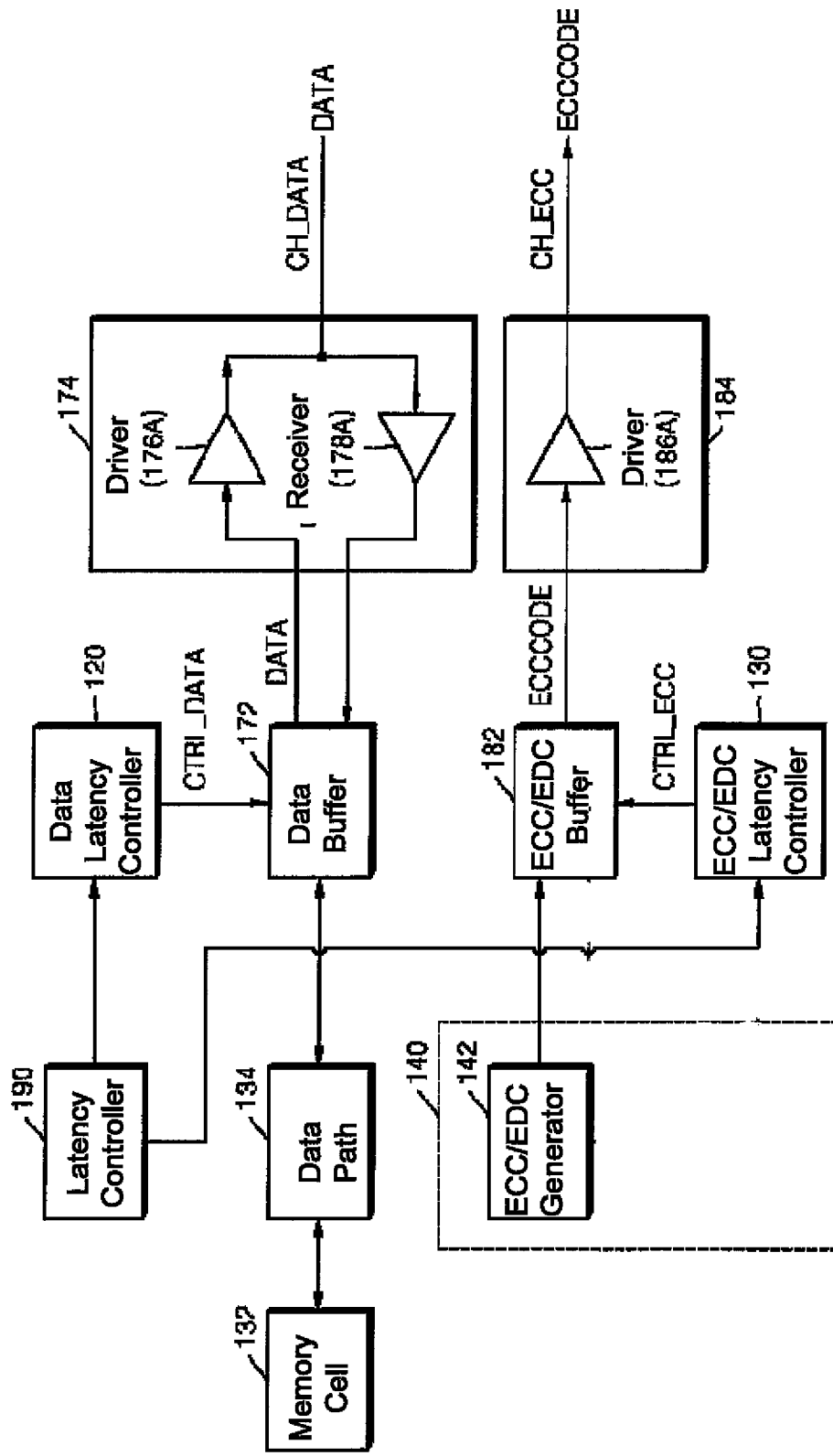
FIG. 9 is a block diagram of a memory device according to another embodiment of the present invention.

FIGS. 8 and 9 are block diagrams of a memory system having bi-directional error correction control capability, and unidirectional error correction control capability, respectively. The block diagrams of FIG. 8 and 9 are similar to that of FIG. 5, and like reference numbers refer to like elements throughout these drawings. Only those aspects of FIG. 8 and 9 that are not found in FIG. 5 are described below in order to avoid redundancy in the description.

FIG. 8 illustrates the example where both the data driver 174 and the ECC/EDC driver 184 are bi-directional, i.e., each is configured to both transmit and receive data. In the figure, this functionality is represented by a driver 176B and receiver 178B in the data driver 174, and by a receiver 188B and driver 186B in the ECC/EDC driver 184.

The example of FIG. 9 is similar to that of FIG. 8, except that the ECC/EDC driver 184 is uni-directional only, i.e., capable of transmission only. This is represented in the figure by the ECC/EDC driver 184 being equipped with a driver 186A and without a receiver. Since the configuration of this embodiment does not receive error correction codes from an external source, the ECC/EDC circuit 140 is not equipped with the ECC/EDC comparator 144 shown in FIG. 8.

While the present invention has been particularly shown and described with reference to exemplary embodiments thereof, it will be understood by those of ordinary skill in the art that various changes in forms and details may be made therein without departing from the spirit and scope of the present invention as defined by the following claims. In the claims, application of the provisions of 35 U.S.C. §112, sixth paragraph, is not intended in the absence of the word "means".

What is claimed is:

1. A memory device, comprising:
   a plurality of parallel data transmission paths each of which transmit a sequence of unit intervals of data;
   an error correction (EC) control transmission path which transmits error correction codes;
   a data driver which is responsive to a read/write command, to drive the data transmitted on the data transmission paths, the data driver operating at a first latency from receipt of the read/write command to transmission of the data on the data transmission paths;
   an EC driver which drives the error correction codes transmitted on the EC transmission path, the EC driver operating at a second latency defined by a number of the unit intervals of the data transmitted on the data transmission paths prior to transmission of a corresponding error correction code on the EC transmission path; and
   an EC latency controller which variably controls the second latency based on a transmission frequency of the data on the data transmission paths,
   wherein the EC latency controller is responsive to at least one of an externally supplied signal or a mode register set (MRS).

2. The memory device of claim 1, wherein the number of unit intervals of the data defining the second latency increases with an increase in the transmission frequency.

3. The memory device of claim 1, further comprising a data latency controller which variably controls the first latency.

4. The memory device of claim 1, wherein the EC driver is bi-directional.

5. The memory device of claim 1, wherein the EC driver is uni-directional.

6. The memory device of claim 1, wherein the data and the error correction codes are transmitted in data packets.

7. The memory device of claim 1, wherein the memory device is a semiconductor memory.

8. The memory device of claim 1, wherein the memory device is a memory controller.

\* \* \* \* \*